US008250514B1

(12) United States Patent
Wadland et al.

(10) Patent No.: US 8,250,514 B1
(45) Date of Patent: Aug. 21, 2012

(54) LOCALIZED ROUTING DIRECTION

(75) Inventors: Ken Wadland, Grafton, MA (US);
Randall Lawson, Westford, MA (US);
Jelena Radumilo-Franklin, Westford, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 355 days.

(21) Appl. No.: 11/457,272

(22) Filed: Jul. 13, 2006

(51) Int. Cl.
*G06F 17/50* (2006.01)

(52) U.S. Cl. ........ 716/131; 716/126; 716/122; 716/128; 716/129; 716/130

(58) Field of Classification Search .............. 716/12–14, 716/126–131
See application file for complete search history.

(56) References Cited

U.S. PATENT DOCUMENTS

| | | |
|---|---|---|
| 4,571,451 A | 2/1986 | Linsker et al. |
| 4,615,011 A | 9/1986 | Linsker |
| 4,777,606 A | 10/1988 | Fournier |
| 4,782,193 A | 11/1988 | Linsker |
| 4,855,253 A | 8/1989 | Weber |
| 4,855,929 A | 8/1989 | Nakajima |
| 4,910,680 A | 3/1990 | Hiwatshi |
| 5,375,069 A | 12/1994 | Satoh et al. |
| 5,541,005 A | 7/1996 | Bezama et al. |
| 5,635,736 A | 6/1997 | Funaki et al. |
| 5,637,920 A | 6/1997 | Loo |
| 5,640,327 A | 6/1997 | Ting |
| 5,646,830 A | 7/1997 | Nagano |
| 5,650,653 A | 7/1997 | Rostoker et al. |
| 5,673,201 A | 9/1997 | Malm et al. |
| 5,689,433 A | 11/1997 | Edwards |
| 5,723,908 A | 3/1998 | Fuchida et al. |
| 5,737,237 A | 4/1998 | Tanaka et al. |
| 5,784,289 A | 7/1998 | Wang |
| 5,798,936 A | 8/1998 | Cheng |
| 5,801,385 A | 9/1998 | Endo et al. |

(Continued)

FOREIGN PATENT DOCUMENTS

JP 04000677 1/1992

(Continued)

OTHER PUBLICATIONS

Notice of Allowance of U.S. Appl. No. 09/733,104, Nov. 16, 2004 (mailing date), Teig, et al.

(Continued)

*Primary Examiner* — Thuan Do
*Assistant Examiner* — Nha Nguyen
(74) *Attorney, Agent, or Firm* — Adeli & Tollen LLP

(57) ABSTRACT

A routing method for a multilayer circuit design layout that has a set of possible preferred local routing directions and a default preferred routing direction for each layer. The method receives a set of user specified constraints on routing directions for particular regions of the design layout. The method tessellates the available routing space into separate tiles and automatically defines a preferred local routing direction for each tile based on the user specified constraints. The set of user specified constraints includes user designated flows, locked etches, "etch keep-out" areas, user "planned" data, etc. A routing method for a multilayer design layout that receives a first set of user specified preferred routing directions for particular regions of the multilayer design layout. The method tessellates the available routing space into separate tiles and automatically defines a second preferred local routing direction for each tile based on the user specified preferred routing directions.

37 Claims, 13 Drawing Sheets

U.S. PATENT DOCUMENTS

| | | | |
|---|---|---|---|
| 5,801,960 A | 9/1998 | Takano et al. | |
| 5,811,863 A | 9/1998 | Rostoker et al. | |
| 5,814,847 A | 9/1998 | Shihadeh et al. | |
| 5,822,214 A | 10/1998 | Rostoker et al. | |
| 5,880,969 A | 3/1999 | Hama et al. | |
| 5,889,329 A | 3/1999 | Rostoker et al. | |
| 5,980,093 A | 11/1999 | Jones et al. | |
| 6,006,024 A * | 12/1999 | Guruswamy et al. | 716/12 |
| 6,014,507 A * | 1/2000 | Fujii | 716/12 |
| 6,077,309 A | 6/2000 | Lin | |
| 6,111,756 A | 8/2000 | Moresco | |
| 6,150,193 A | 11/2000 | Glenn | |
| 6,209,123 B1 * | 3/2001 | Maziasz et al. | 716/14 |
| 6,256,769 B1 * | 7/2001 | Tamarkin et al. | 716/12 |
| 6,260,183 B1 | 7/2001 | Raspopovic et al. | |
| 6,262,487 B1 | 7/2001 | Igarashi et al. | |
| 6,263,475 B1 | 7/2001 | Toyonaga et al. | |
| 6,301,686 B1 | 10/2001 | Kikuchi et al. | |
| 6,307,256 B1 | 10/2001 | Chiang et al. | |
| 6,316,838 B1 | 11/2001 | Ozawa et al. | |
| 6,324,674 B2 | 11/2001 | Andreev et al. | |
| 6,330,707 B1 * | 12/2001 | Shinomiya et al. | 716/14 |
| 6,338,985 B1 | 1/2002 | Greenwood | |
| 6,407,434 B1 | 6/2002 | Rostoker et al. | |
| 6,412,097 B1 | 6/2002 | Kikuchi et al. | |
| 6,441,470 B1 | 8/2002 | Shenoy | |
| 6,448,591 B1 | 9/2002 | Juengling | |
| 6,516,447 B2 | 2/2003 | Wadland et al. | |
| 6,516,455 B1 | 2/2003 | Teig et al. | |
| 6,526,555 B1 | 2/2003 | Teig et al. | |
| 6,601,222 B1 * | 7/2003 | Mehrotra et al. | 716/5 |
| 6,645,842 B2 | 11/2003 | Igarashi et al. | |
| 6,651,233 B2 | 11/2003 | Teig et al. | |
| 6,671,864 B2 | 12/2003 | Teig et al. | |
| 6,711,727 B1 | 3/2004 | Teig et al. | |
| 6,769,105 B1 | 7/2004 | Teig et al. | |
| 6,772,406 B1 | 8/2004 | Trimberger | |
| 6,792,587 B2 | 9/2004 | Xing et al. | |
| 6,858,928 B1 | 2/2005 | Teig et al. | |
| 6,858,935 B1 | 2/2005 | Teig et al. | |
| 6,858,939 B1 | 2/2005 | Teig et al. | |
| 6,870,255 B1 | 3/2005 | Teig et al. | |
| 6,889,371 B1 | 5/2005 | Teig et al. | |
| 6,889,372 B1 | 5/2005 | Teig et al. | |
| 6,898,773 B1 | 5/2005 | Teig et al. | |
| 6,900,540 B1 | 5/2005 | Teig et al. | |
| 6,915,500 B1 | 7/2005 | Teig et al. | |
| 6,973,634 B1 | 12/2005 | Teig et al. | |
| 6,988,258 B2 | 1/2006 | Tan et al. | |
| 6,996,789 B2 | 2/2006 | Teig et al. | |
| 7,003,748 B1 | 2/2006 | Hsu | |
| 7,003,752 B2 | 2/2006 | Teig et al. | |
| 7,010,771 B2 | 3/2006 | Teig et al. | |
| 7,013,445 B1 | 3/2006 | Teig et al. | |
| 7,017,137 B2 | 3/2006 | Wadland et al. | |
| 7,024,650 B2 | 4/2006 | Teig et al. | |
| 7,036,101 B2 | 4/2006 | He et al. | |
| 7,036,105 B1 | 4/2006 | Teig et al. | |
| 7,047,513 B2 | 5/2006 | Teig et al. | |
| 7,055,120 B2 | 5/2006 | Teig et al. | |
| 7,058,919 B1 * | 6/2006 | Young et al. | 716/12 |
| 7,062,743 B2 | 6/2006 | Kahng et al. | |
| 7,080,342 B2 | 7/2006 | Teig et al. | |
| 7,086,024 B2 | 8/2006 | Hsu et al. | |
| 7,096,449 B1 | 8/2006 | Teig et al. | |
| 7,117,468 B1 | 10/2006 | Teig et al. | |
| 7,171,635 B2 | 1/2007 | Teig et al. | |
| 7,174,529 B1 | 2/2007 | Hetzel | |
| 7,185,304 B2 | 2/2007 | Suto et al. | |
| 7,197,738 B1 | 3/2007 | Hetzel et al. | |
| 7,340,711 B2 | 3/2008 | Hetzel et al. | |
| 7,412,682 B2 | 8/2008 | Malhotra et al. | |
| 7,441,220 B2 | 10/2008 | Hetzel et al. | |
| 7,480,885 B2 | 1/2009 | Frankle et al. | |
| 2001/0009031 A1 | 7/2001 | Nitta et al. | |
| 2001/0039643 A1 | 11/2001 | Kuroda et al. | |
| 2002/0069397 A1 | 6/2002 | Teig et al. | |
| 2002/0100009 A1 * | 7/2002 | Xing et al. | 716/12 |
| 2002/0124231 A1 | 9/2002 | Teig et al. | |
| 2002/0147958 A1 * | 10/2002 | Teig et al. | 716/12 |
| 2003/0009737 A1 | 1/2003 | Xing | |
| 2003/0025205 A1 | 2/2003 | Shively et al. | |
| 2003/0084416 A1 | 5/2003 | Dai et al. | |
| 2003/0088844 A1 * | 5/2003 | Teig et al. | 716/14 |
| 2003/0126578 A1 | 7/2003 | Wadland et al. | |
| 2004/0098696 A1 | 5/2004 | Teig et al. | |
| 2004/0098697 A1 | 5/2004 | Frankle et al. | |
| 2004/0243960 A1 | 12/2004 | Hsu et al. | |
| 2005/0071797 A1 * | 3/2005 | Fujii | 716/12 |
| 2005/0138578 A1 * | 6/2005 | Alpert et al. | 716/2 |
| 2005/0138593 A1 * | 6/2005 | Okumura | 716/13 |
| 2005/0229134 A1 | 10/2005 | Hetzel et al. | |
| 2005/0240894 A1 | 10/2005 | Teig | |
| 2005/0273746 A1 | 12/2005 | Malhotra et al. | |
| 2005/0273747 A1 | 12/2005 | Malhotra et al. | |
| 2005/0273748 A1 | 12/2005 | Hetzel et al. | |
| 2006/0112366 A1 | 5/2006 | Wadland et al. | |
| 2006/0156266 A1 * | 7/2006 | Alpert et al. | 716/13 |
| 2006/0236291 A1 * | 10/2006 | Siegel et al. | 716/13 |
| 2006/0242614 A1 | 10/2006 | Wadland et al. | |
| 2009/0024977 A1 | 1/2009 | Hetzel et al. | |
| 2010/0180250 A1 | 7/2010 | Malhotra et al. | |

FOREIGN PATENT DOCUMENTS

| | | |
|---|---|---|
| JP | 2000-082743 | 3/2000 |
| WO | WO 2005/122027 | 12/2005 |
| WO | WO 2005/122028 | 12/2005 |

OTHER PUBLICATIONS

Non-Final Office Action of U.S. Appl. No. 09/733,104, Oct. 27, 2003 (mailing date), Teig, et al.

Advisory Action of U.S. Appl. No. 09/733,104, Apr. 17, 2003 (mailing date), Teig, et al.

Final Office Action of U.S. Appl. No. 09/733,104, Sep. 26, 2002 (mailing date), Teig, et al.

Non-Final Office Action of U.S. Appl. No. 09/733,104, Jan. 3, 2002 (mailing date), Teig, et al.

Non-Final Office Action of U.S. Appl. No. 11/031,472, Sep. 20, 2006 (mailing date), Teig, et al.

Notice of Allowance of U.S. Appl. No. 09/739,582, Nov. 16, 2004 (mailing date), Teig, et al.

Non-Final Office Action of U.S. Appl. No. 09/739,582, Feb. 27, 2004 (mailing date), Teig, et al.

Non-Final Office Action of U.S. Appl. No. 09/739,582, May 21, 2003 (mailing date), Teig et al.

Final Office Action of U.S. Appl. No. 09/739,582, Sep. 25, 2002 (mailing date), Teig, et al.

Non-Final Office Action of U.S. Appl. No. 09/739,582, Jan. 3, 2002 (mailing date), Teig, et al.

Supplemental Notice of Allowance of U.S. Appl. No. 10/043,853, Mar. 3, 2005 (mailing date), Teig, et al.

Notice of Allowance of U.S. Appl. No. 10/043,853, Nov. 5, 2004 (mailing date), Teig, et al.

Non-Final Office Action of U.S. Appl. No. 10/043,853, Mar. 2, 2004 (mailing date), Teig, et al.

Non-Final Office Action of U.S. Appl. No. 10/043,853, Jul. 8, 2003 (mailing date), Teig, et al.

Restriction Requirement of U.S. Appl. No. 10/043,853, Mar. 11, 2003 (mailing date), Teig, et al.

Notice of Allowance of U.S. Appl. No. 10/043,808, Aug. 24, 2004 (mailing date), Teig, et al.

Non-Final Office Action of U.S. Appl. No. 10/043,808, Feb. 24, 2004 (mailing date), Teig, et al.

Final Office Action of U.S. Appl. No. 10/043,808, Jul. 11, 2003 (mailing date), Teig, et al.

Non-Final Office Action of U.S. Appl. No. 10/043,808, Nov. 1, 2002 (mailing date), Teig, et al.

Notice of Allowance of U.S. Appl. No. 09/681,776, Mar. 22, 2004 (mailing date), Teig, et al.

Advisory Action of U.S. Appl. No. 09/681,776, Jan. 6, 2004 (mailing date), Teig, et al.

Final Office Action of U.S. Appl. No. 09/681,776, Apr. 3, 2003 (mailing date), Teig, et al.
Non-Final Office Action of U.S. Appl. No. 09/681,776, Jun. 13, 2002 (mailing date), Teig, et al.
Restriction Requirement of U.S. Appl. No. 09/681,776, Feb. 22, 2002 (mailing date), Teig, et al.
Notice of Allowance of U.S. Appl. No. 11/005,316, Jun. 5, 2008 (mailing date), Hetzel, et al.
Non-Final Office Action of U.S. Appl. No. 11/005,316, Oct. 2, 2007 (mailing date), Hetzel, et al.
Non-Final Office Action of U.S. Appl. No. 11/005,316, Apr. 26, 2007 (mailing date), Hetzel, et al.
Restriction Requirement of U.S. Appl. No. 11/005,316, Feb. 12, 2007 (mailing date), Hetzel, et al.
Response to Rule 312 Communication of U.S. Appl. No. 11/005,169, May 1, 2008 (mailing date), Malhotra, et al.
Supplemental Notice of Allowance of U.S. Appl. No. 11/005,169, Apr. 10, 2008 (mailing date), Malhotra, et al.
Amendment after Notice of Allowance of U.S. Appl. No. 11/005,169, Apr. 2, 2008 (mailing date), Malhotra, et al.
Notice of Allowance of U.S. Appl. No. 11/005,169, Jan. 2, 2008 (mailing date), Malhotra, et al.
Final Office Action of U.S. Appl. No. 11/005,169, Aug. 9, 2007 (mailing date), Malhotra, et al.
Non-Final Office Action of U.S. Appl. No. 11/005,169, Jan. 18, 2007 (mailing date), Malhotra, et al.
Amendment after Notice of Allowance of U.S. Appl. No. 11/005,448, Dec. 7, 2007 (mailing date), Hetzel et al.
Supplemental Notice of Allowance of U.S. Appl. No. 11/005,448, Oct. 18, 2007 (mailing date), Hetzel et al.
Notice of Allowance of U.S. Appl. No. 11/005,448, Sep. 7, 2007 (mailing date), Hetzel, et al.
Non-Final Office Action of U.S. Appl. No. 11/005,448, Mar. 14, 2007 (mailing date), Hetzel, et al.
Non-Final Office Action of U.S. Appl. No. 11/005,448, Aug. 25, 2006 (mailing date), Hetzel, et al.
Restriction Requirement of U.S. Appl. No. 11/005,448, May 5, 2006 (mailing date), Hetzel, et al.
Restriction Requirement of U.S. Appl. No. 11/005,448, Nov. 23, 2005 (mailing date), Hetzel, et al.
Restriction Requirement of U.S. Appl. No. 11/005,162, Mar. 17, 2008 (mailing date), Malhotra, et al.
Non-Final Office Action of U.S. Appl. No. 11/005,162, Jun. 12, 2007 (mailing date), Malhotra, et al.
International Preliminary Report on Patentability (IPRP) for PCT/US2005/019361, Dec. 14, 2006 (mailing date), Cadence Design Systems, Inc.
International Search Report for PCT/US2005/019361, Sep. 6, 2006 (mailing date), Cadence Design Systems, Inc.
Written Opinion of the International Searching Authority for PCT/US2005/019361, Sep. 6, 2006 (mailing date), Cadence Design Systems, Inc.
International Preliminary Report on Patentability (IPRP) for PCT/US2005/019359, Dec. 14, 2006 (mailing date), Cadence Design Systems, Inc.
International Search Report for PCT/US2005/019359, Feb. 15, 2006 (mailing date), Cadence Design Systems, Inc.
Written Opinion of the International Searching Authority for PCT/US2005/019359, Feb. 15, 2006 (mailing date), Cadence Design Systems, Inc.
Cheng-Kok Koh and Patrick H. Madden, Manhattan or Non Manhattan? A Study of Alternative VLSI routing Architectures, 2000, pp. 47-52.
U.S. Appl. No. 11/098,039, filed Apr. 5, 2005, Wadland, et al.
U.S. Appl. No. 11/492,021, filed Jul. 25, 2006, Horlick, et al.
Final Office Action of U.S. Appl. No. 11/005,162, Aug. 29, 2008, Malhotra, Anish et al.
Non-Final office action of U.S. Appl. No. 11/005,162, Mar. 13, 2009, Malhotra, Anish et al.
Ousterhout, "Corner Stitching: A Data-Structuring Technique for VLSI Layout Tools", IEEE Transactions on Computer-Aided Design, vol. CAD-3, No. 1, Jan. 1984.
Updated portions of prosecution history of U.S. Appl. No. 11/005,162, Dec. 1, 2009, Malhotra, Anish, et al.
Non-Final Office Action of U.S. Appl. No. 12/731,078, Jun. 23, 2010, Malhotra, Anish, et al.
Updated portions of prosecution history of U.S. Appl. No. 11/005,316, Sep. 5, 2008, Hetzel, Asmus, et al.
Updated portions of prosecution history of U.S. Appl. No. 11/005,169, Oct. 9, 2007, Malhotra, Anish, et al.
Updated portions of prosecution history of U.S. Appl. No. 11/005,448, Jun. 14, 2007, Hetzel, Asmus, et al.
Preliminary Amendment of U.S. Appl. No. 12/241,034, Nov. 18, 2008, Hetzel, Asmus, et al.
Updated portions of prosecution history of U.S. Appl. No. 11/005,316, Sep. 10, 2008, Hetzel, Asmus, et al.
Updated portions of prosecution history of U.S. Appl. No. 12/241,034, May 5, 2011, Hetzel, Asmus, et al.
Updated portions of prosecution history of U.S. Appl. No. 12/731,078, May 25, 2011, Malhotra, Anish, et al.

* cited by examiner

LOCALIZED ROUTING DIRECTION

FIELD OF THE INVENTION

The present invention is directed towards method and apparatus for routing.

BACKGROUND OF THE INVENTION

A circuit design layout, such as an integrated circuit ("IC"), a printed circuit board (PCB), an IC package, etc. is a device (e.g., a semiconductor device) that includes many electronic components, such as transistors, resistors, diodes, and so on. These components are often interconnected to form multiple circuit components, such as gates, cells, memory units, arithmetic units, controllers, decoders, etc. A circuit design layout includes multiple layers of wiring that interconnect its electronic and circuit components. Traditionally, circuit design layouts use preferred direction ("PD") wiring models, which specify a preferred wiring direction for each of their wiring layers. In preferred direction wiring models, the preferred direction typically alternates between successive wiring layers. One example of a PD wiring model is the PD Manhattan wiring model, which specifies alternating layers of preferred-direction horizontal and vertical wiring.

Design engineers design the IC's and PCB's by transforming logical or circuit descriptions of the IC's or PCB's into geometric descriptions, called layouts. These layouts typically include (1) circuit modules (i.e., geometric representations of electronic or circuit IC components) with pins, and (2) interconnect lines (i.e., geometric representations of wiring) that connect the pins of the circuit modules. A net is typically defined as a collection of pins that need to be connected. A list of all or some of the nets in a layout is referred to as a net list.

To create layouts, design engineers typically use electronic design automation ("EDA") applications. These applications provide sets of computer-based tools for creating, editing, and analyzing layouts for IC design, Printed Circuit Board (PCB) designs, or Packages. One EDA tool is a router that defines routes for interconnect lines that typically connect the pins of the nets.

The underlying engine for essentially all modern routers is a path finding algorithm, herein called the Single Connection Router (SCR). The SCR selects a particular path (or route) from one or more source locations (called pads) on one or more layers to one or more target locations (also pads) on one or more layers.

Potential paths are considered by "expanding" from one location to the next, starting with the location of the source (or one of the potential source locations) and ending with the target location (or one of several potential target locations). In a gridded-router, the expansion proceeds from one cell to an adjacent cell on the same layer or to the corresponding cell on another layer.

In a topological router, the expansion proceeds along the topological map from one channel to the next or to another layer. A topological route is a route that is defined in terms of its relation to other layout items, such as pins, obstacles, boundaries, and/or other topological routes of other nets. As such, a topological route provides a general plan for how to route a net, without necessarily providing a specific geometric path to do so. One topological route represents a set of diffeomorphic geometric routes (i.e., a set of geometric routes that can be morphed into one another through a continuous sequence of perturbations without changing the route's path relative to any other pin, path, or obstacle).

The path selection process described above is controlled by means of cost functions. Costs are typically computed for each expansion and then added together to get a partial subtotal to reach from its source up to the current location. Costs have numeric value (for example, higher is worse). The SCR finds the path from a source location to a target location with the lowest total cost that satisfies all the predetermined rules. This cost is typically computed as the sum of several different individual costs, such as direction, length, accumulated crosstalk, etc. The direction cost is usually charged whenever the direction of the expansion differs from the "preferred direction" for that layer. For example, routing vertically on a horizontal layer is considered a "wrong-way" and incurs an extra "wrong-way cost".

The overall quality of the routing is directly determined by the cost computation. Better algorithms for computing costs result in better routing, where better might mean faster (fewer potential paths considered) or higher quality (higher likelihood of 100% completion) or some combination. Improvements to the underlying cost computation directly account for significant differences between competing routing products. Therefore, it is critical to the success of any router to use the best possible cost algorithms.

Historically, almost all routers (for IC, PCB and Packages) have been Manhattan routers. In a Manhattan (or horizontal/vertical) router, most routing etch on some layers is horizontal and most routing etch on the other layers is vertical. When selecting paths, the SCR would insert a via (a connection between layers) to connect the horizontal etch segments on one layer with the vertical segments on the other layer. This technique is still used in some IC routers where the size of a via is relatively small compared to the size of etch segments.

Some fabrication technologies used in manufacturing IC's do not allow any vertical routing on a horizontal layer or any horizontal routing on a vertical layer due to lithography limitations. For instance, FIG. 1 illustrates an example of horizontal routing and FIG. 2 illustrates an example of vertical routing. In these figures, etch segments are shown in black and vias are shown in grey. As shown, in this example, via locations are the same on both layers.

Some IC routers and PCB routers have implemented a wrong-way cost. This allows some horizontal routing on vertical layers and some vertical routing on horizontal layers but makes the cost higher than staying with the layer's preferred routing direction. FIG. 3 illustrates an example of wrong-way on routing on a vertical layer. During initial routing passes, this cost is typically very high which causes a strong bias against wrong-way routing. In later passes, this cost is typically reduced to allow the router to use wrong-way routing when needed to resolve difficult routing situations.

A few routers have allowed more than just vertical and horizontal routing directions. They might, for example, support layers with a +45° or −45° bias or other angles. Some gridded routers have automatically flipped the preferred routing direction along the edge of the design. For example, on a gridded-design, there is no point in preferring horizontal routing in cells along the east or west edge of the design, since there is no adjacent cell in that direction.

Some routers allow users to manually override the preferred routing direction for a particular region of the design. For example, this would allow the user to change the preferred routing direction on the north side of a ball grid array (BGA) to be vertical on all layers, even on layers with horizontal preferred directions. However, forcing the user to manually override the preferred routing direction for each section of the design is slow, tedious and error prone. It limits the "what if" planning that the user can explore.

Adjusting routing directions only around the outer perimeter of the design had some advantage many years ago because it allowed some routing to go all the way around the outside, thus completing the last few connections. However, most of the congestion is near high-pin count devices. Also, most nets have length limitations which disallow very long connections. Thus, flipping the preferred routing direction only around the outside edge of the design has limited value in modern routers. Therefore, there is a need in the art for a general mechanism to allow the router to automatically adjust the preferred routing direction for a region of the design.

SUMMARY OF THE INVENTION

Some embodiments present a method of routing for a multilayer circuit design layout, such as an integrated circuit (IC), a printed circuit board (PCB), an IC package, etc. The design layout has a set of possible preferred local routing directions and each layer has a default preferred routing direction. The method receives a set of user specified constraints on routing directions for particular regions of the multilayer design layout. The method tessellates the available space for routing into separate tiles.

The set of user specified constraints includes one or more of the following: user designated flows, locked etches, "etch keep-out" areas, user "planned" or user "viewable" data, etc. The method automatically defines a preferred local routing direction for each tile based on a set of user specified constraints by performing the following steps. The method initializes an interim preferred routing direction of each tile to a predetermined direction. The method uses a set of objects created by the user defined constraints to compute new routing directions for each tile. The method uses the new routing directions to modify the interim preferred routing direction of each tile. The method uses the interim preferred routing direction of each particular tile to determine a final preferred routing direction for the particular tile.

Some embodiments present a method of routing for a multilayer circuit design layout. The design layout has a set of possible preferred local routing directions and each layer has a default preferred routing direction. The method receives a first set of user specified preferred routing directions for particular regions of the multilayer design layout. The method tessellates the available space for routing into separate tiles. The tiles are determined independent of the regions. The method automatically defines a second preferred local routing direction for each tile based on the user specified preferred routing directions.

Some embodiments present a method of determining preferred routing directions for a multilayer circuit design layout. The multilayer circuit design layout has a set of possible preferred routing directions. Each layer has a general preferred routing direction. The method tessellates available space for routing into separate tiles. The method initializes each tile with all possible preferred routing directions marked as available. The method uses a set of user defined constraints to determine which preferred directions are blocked for each tile. The method determines preferred local routing directions for each tile based on preferred directions that are not blocked on each tile.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
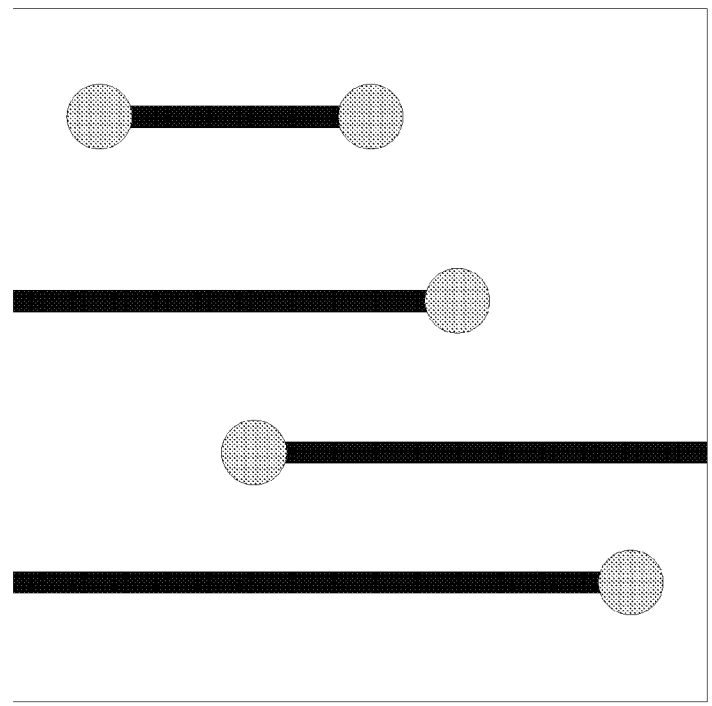
FIG. 1 illustrates an example of horizontal routing.
Figure 2:
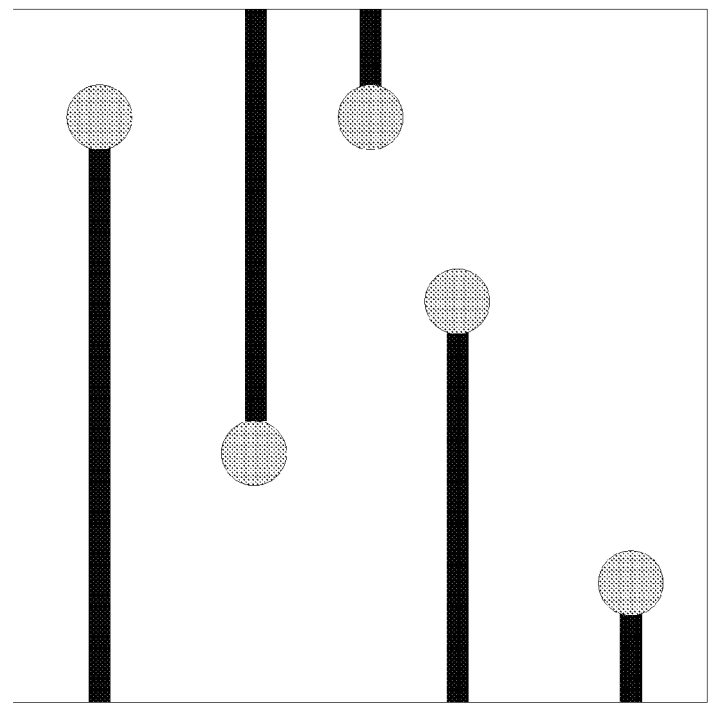
FIG. 2 illustrates an example of vertical routing.
Figure 3:
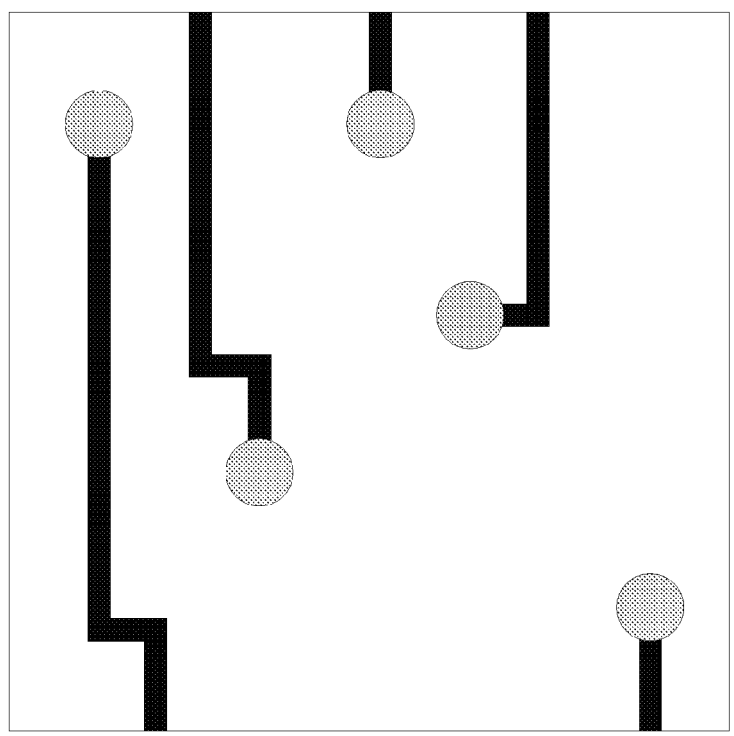
FIG. 3 shows an example of wrong-way routing on a layer of an IC that has a preferred vertical direction.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments present a method of routing for a multilayer circuit design layout, such as an integrated circuit (IC), a printed circuit board (PCB), an IC package, etc. The design layout has a set of possible preferred local routing directions and each layer has a default preferred routing direction. The method receives a set of user specified constraints on routing directions for particular regions of the multilayer design layout. The method tessellates the available space for routing into separate tiles.

The set of user specified constraints includes one or more of the following: user designated flows, locked etches, "etch keep-out" areas, user "planned" or user "viewable" data, etc. The method automatically defines a preferred local routing direction for each tile based on a set of user specified constraints by performing the following steps. The method initializes an interim preferred routing direction of each tile to a predetermined direction. The method uses a set of objects created by the user defined constraints to compute new routing directions for each tile. The method uses the new routing directions to modify the interim preferred routing direction of each tile. The method uses the interim preferred routing direction of each particular tile to determine a final preferred routing direction for the particular tile.

Some embodiments present a method of routing for a multilayer circuit design layout. The design layout has a set of possible preferred local routing directions and each layer has a default preferred routing direction. The method receives a first set of user specified preferred routing directions for particular regions of the multilayer design layout. The method tessellates the available space for routing into separate tiles. The tiles are determined independent of the regions. The method automatically defines a second preferred local routing direction for each tile based on the user specified preferred routing directions.

Some embodiments present a method of determining preferred routing directions for a multilayer circuit design layout. The multilayer circuit design layout has a set of possible preferred routing directions. Each layer has a general preferred routing direction. The method tessellates available space for routing into separate tiles. The method initializes each tile with all possible preferred routing directions marked as available. The method uses a set of user defined constraints to determine which preferred directions are blocked for each tile. The method determines preferred local routing directions for each tile based on preferred directions that are not blocked on each tile.

Several more detailed embodiments of the invention are described in sections below. Before describing these embodiments further, the overall flow of a router of some embodiments is given in Section I below. This discussion is followed by the discussion in Section II of a method that some embodiments use to determine preferred routing directions on regions of a circuit design layout. Next, Section III describes an alternative method that some embodiments use to determine preferred routing directions. Last, Section IV describes a computer system with which one embodiment of the invention is implemented.

I. Overall Flow

Figure 4:
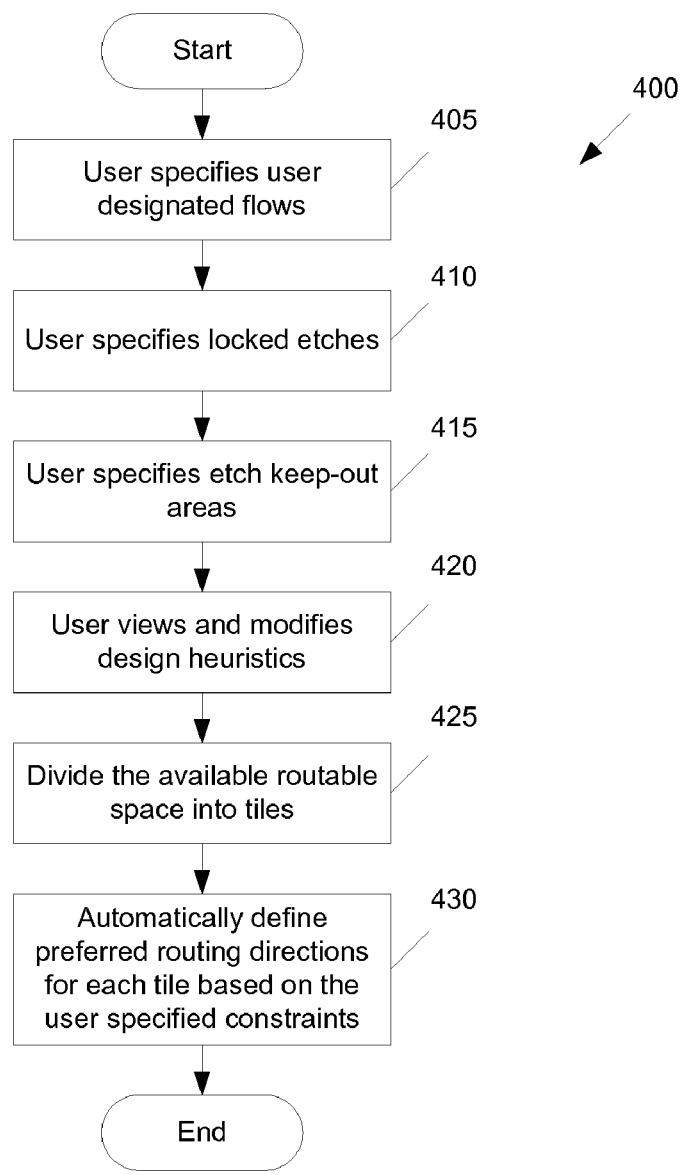
FIG. 4 conceptually illustrates the overall flow for determining the preferred routing direction in some embodiments.
Figure 5:
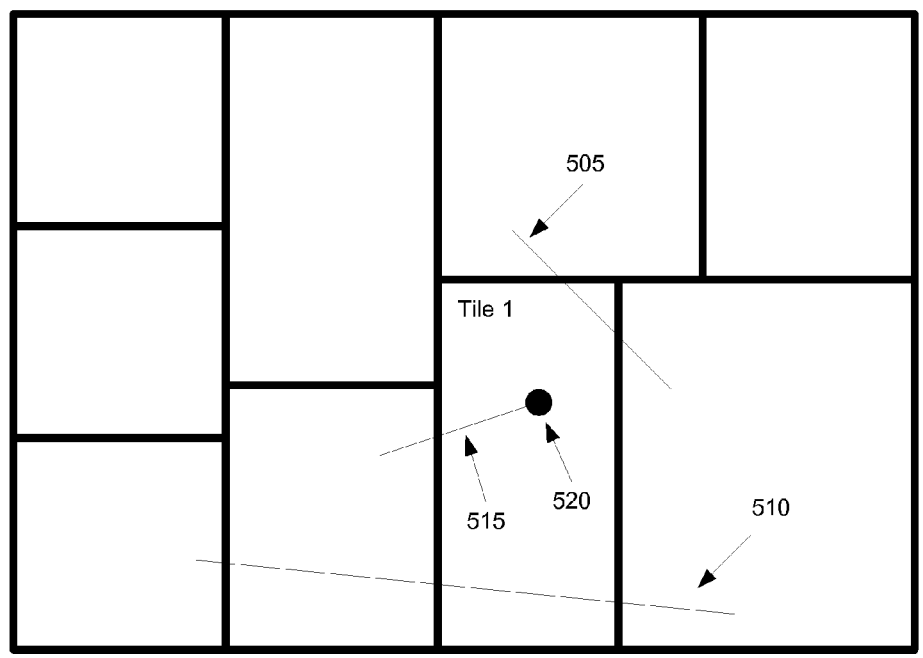
FIG. 5 illustrates several user designated flow that are passing completely though a tile and a user designated flow that terminates to a flow via.

FIG. 4 conceptually illustrates the overall process 400 that some embodiments use to determine localized preferred routing directions. As shown, the user first specifies (at 405-420) a set of constraints. In some embodiments, the user utilizes a graphical user interface (GUI) to enter these constraints. These constraints, as described below, create objects that are used to determine preferred routing directions for individual regions of the circuit design layout. Specifically, the user specifies (at 405) user designated flows. Flows are polylines that the user specifies as approximate paths for one or more connections to act as a guide to the router. FIG. 5 conceptually illustrates several user designated flows 505-515. As shown, flows 505 and 510 completely pass through Tile 1. Flow 505 traverses two adjacent edges of the tile while flow 510 traverses two opposite edges of the tile. Flow 515, on the other hand, ends with a flow via 520 and does not completely pass through Tile 1. Also, as shown in FIG. 5, a flow may pass through several tiles and a tile may have several flows passing through it.

Figure 6:
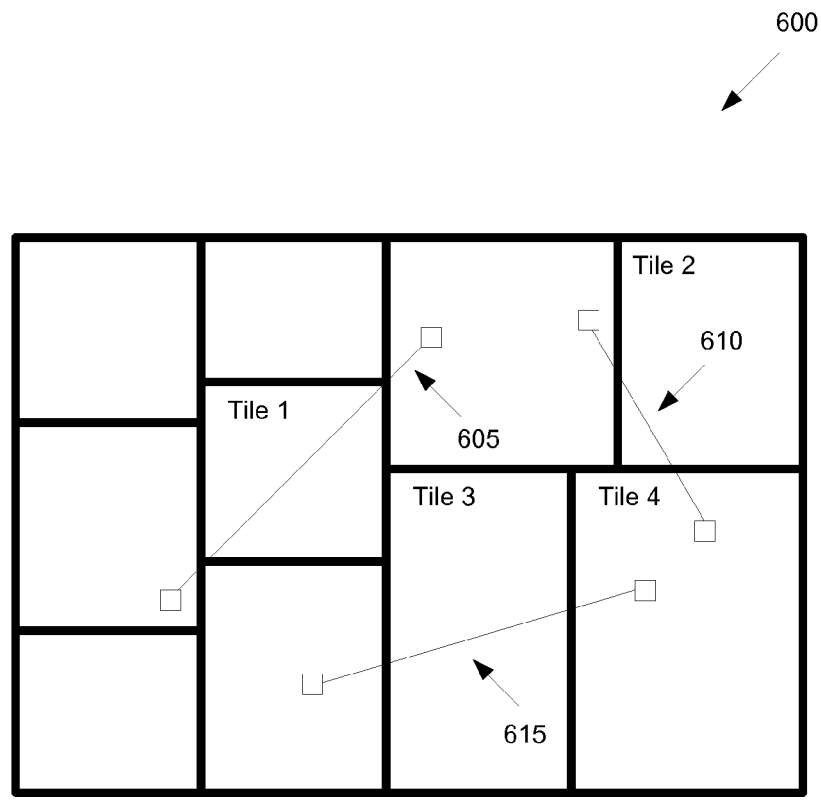
FIG. 6 illustrates several locked etches.

Next, the user specifies (at 410) locked etches. Locked etches are any connections between pads or pins of the design layout that the user has designated not to be modified. FIG. 6 conceptually illustrates three locked etches 605-615 between three pairs of pads (the pads are shown as small rectangles). Locked etch 605 intersects corners of Tile 1. Locked etch 610 traverses two adjacent edges of Tile 2. Locked etch 615 traverses two opposite edges of Tile 3.

Figure 7:
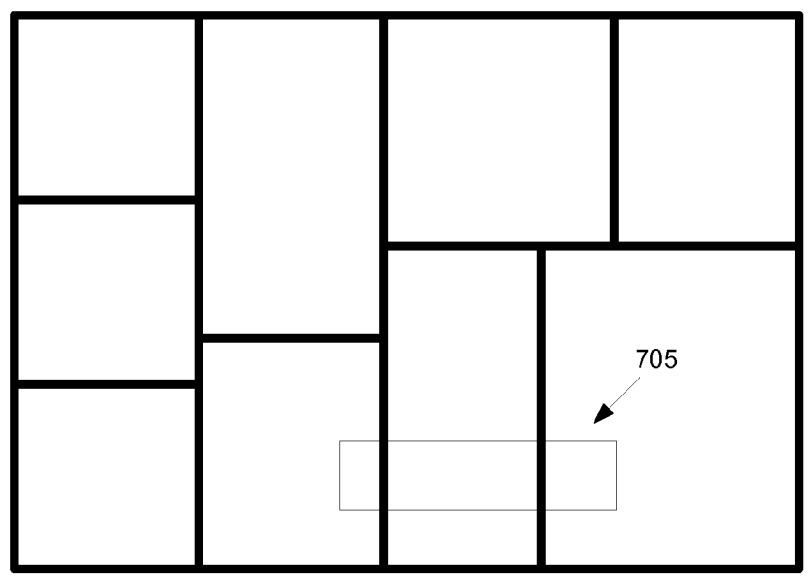
FIG. 7 illustrates an etch keep-out area.

Next, the user specifies (at 415) etch "keep-out" areas. An etch keep-out area is a region of the design that the user has indicated cannot be used for any etch. FIG. 7 conceptually illustrates an etch keep-out area 705.

Next, the user views and modifies (at 420) "planned" or "user viewable" data. Some embodiments provide a mechanism for the users to define their design intent or strategy in the form of data that is stored with the design database. The mechanism allows a user to either use a set of heuristics to define the design intent or strategy or to view and modify a set of design strategies suggested by the system. The router then uses this guidance from the user to create a plan for routing the design. The user can then modify the guidance to the router until the results for the plan are acceptable. Then, using the planned flow, the router can complete the design by creating detailed paths consisting of etch segments and vias. If a significant portion of the planned data blocks any routing directions, they could be marked as blocked. Some embodiments implement only a subset of the user defined constraints described in 405-420 above. Also, the user specified constraints may be specified in any order other than the sequence shown in FIG. 4.

Process 400 also tessellates (at 425) the available space for routing into regions. The process divides the entire region available for routing on all layers of the design layout into separate regions, herein called tiles. Any one tile is on a particular layer but the set of all tiles completely covers the entire routable design area on all layers.

Figure 8:
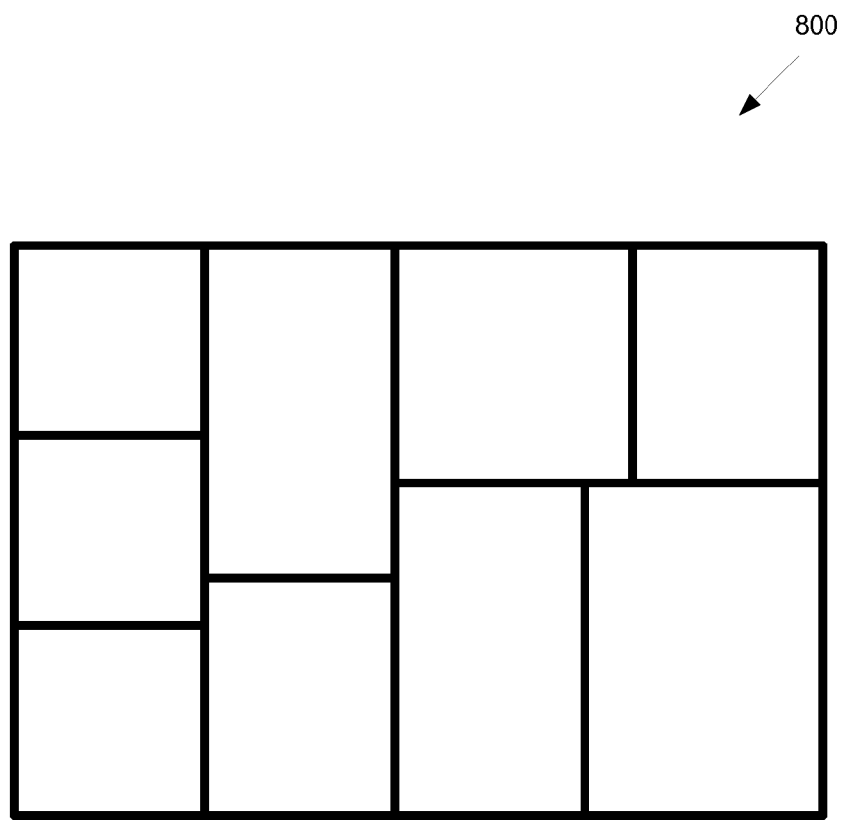
FIG. 8 illustrates tessellating a region into rectangles in some embodiments.

The tiles identified after tessellating can overlap or encompass one or more of the regions for which the user specified constraints are identified. Some tiles can fall within one of those regions. Also, some embodiments determine tiles independently of the user specified constraints. Some embodiments, on the other hand, utilize the user specified constraints (for instant, the vertices of etch keep-out areas) as a criteria for determining tile locations. FIG. 8 conceptually illustrates tessellating of a region 800 into tiles. Although several examples given below use rectangular tile shapes, a person of ordinary skill in the art would realize that the tiles can have other shapes without deviating from teachings of the invention. Also, tessellating can be performed before or after the user defines the user specified constraints.

The process then automatically determines (at 430) the preferred local routing direction of each tile based on the user specified constraints. Detailed description of how several embodiments determine the preferred local routing direction of each tile based on the available data is given in Sections II and III below.

II. Determining Preferred Routing Directions on Regions

Some embodiments use a predetermined set of preferred local routing directions. These embodiments initialize the preferred local routing direction of each tile to mark all directions as available. The user specified constraints are then examined to determine which directions are blocked for each individual tile. A final preferred local routing direction is then determined for each tile.

Figure 9:
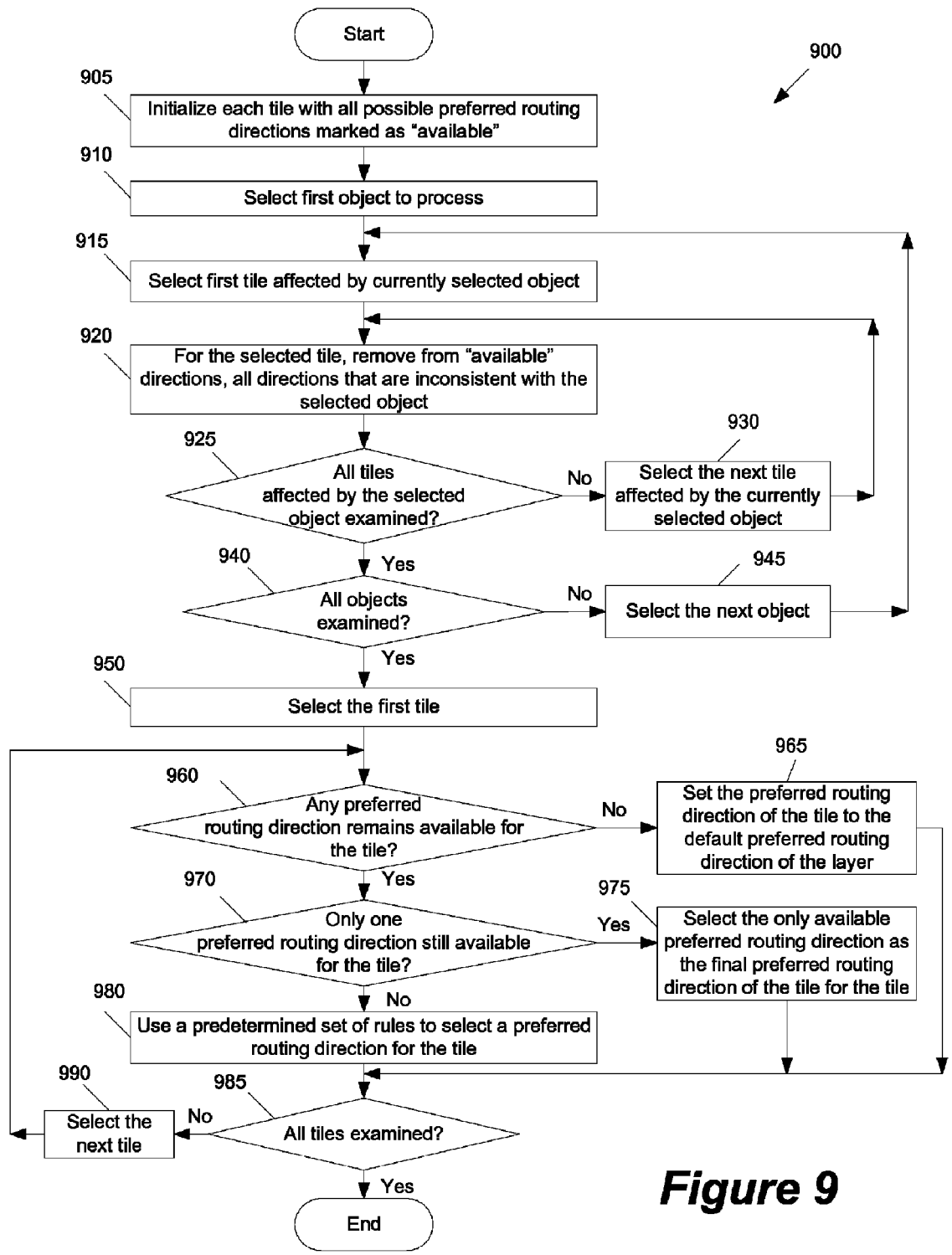
FIG. 9 conceptually illustrates a process for determining preferred local routing direction in some embodiments.

FIG. 9 conceptually illustrates a process 900 that uses this "blocking" approach to determine preferred routing directions on regions of a circuit design layout in some embodiments. Circuit design layouts include integrated circuits (ICs), printed circuit boards (PCBs), and IC packages, and so on. Each layer of the design layout has a default (or general) preferred routing direction. For instance, the top layer in some embodiments may have a horizontal default preferred routing direction, while the bottom layer may have a vertical default preferred routing direction. In the following discussions, the words etch and route are used interchangeably as the invention applies to all above mentioned circuit design layouts.

For simplicity, the steps of defining the user specified constraints (which were described in 405-420 above) and tessellation (which was described in 425 above) are not shown in FIG. 9. As shown in FIG. 9, the process initializes (at 905) each tile with all possible preferred routing directions marked as "available". There are many possible preferred routing directions for a tile. One set of possible preferred routing directions used by some embodiments is:

Horizontal (H)—This preferred direction has no cost for horizontal and high penalty cost for vertical.

Vertical (V)—This preferred direction has no cost for vertical and high penalty cost for horizontal.

TildeHorizontal (~H)—This preferred direction has no cost for horizontal and small penalty cost for vertical.

TildeVertical (~V)—This preferred direction has no cost for vertical and small penalty cost for horizontal.

AnyDirection—There is no cost for vertical or horizontal.

One of ordinary skill in the art would realize that other preferred routing directions can be readily defined. For instance, some embodiments define diagonal preferred routing directions. Also, the preferred routing directions only affect the penalty costs associated with the direction of a route. Each router allocates costs based on other factors, such as the length of a route. Therefore, a horizontal route in a tile that has a local preferred horizontal routing direction will incur no cost based on the direction of the route. The route, however, may still incur costs based on the length of the route. Also, the directions indicated above do not place any restrictions on the route to go, for instance, strictly horizontal or strictly vertical. The directions indicated above are just "preferred" directions. For example, in some embodiments, a router may also allow ±45° diagonal routing. In these embodiments, a preferred horizontal routing direction incurs no directional costs for horizontal routes and high directional costs for vertical and ±45° directions.

Next, process 900 examines (at 910-945) all objects defined by the user specified constraints and removes all directions that are inconsistent with these objects from the set of "available" preferred routing direction of each tile. As described above, examples of the user specified constraints and the objects created by them are user designated flows, locked etches, etch keep-out areas, and user planned (or user viewable) data. Specifically, the process selects (at 910) the first object to process. Next, the process selects (at 915) the first tile that is affected by the currently selected object. As described above (for instance in relation with FIG. 5), each object may affect more than one tile and each tile may be affected by more than one object.

The process then removes (at 920) all directions that are inconsistent with the selected object from the list of "available" preferred routing directions of the tile. The pseudo code below illustrates how some embodiments remove directions based on an object (such as user designated flows, locked etches, etch keep-out areas, etc.) that goes through a tile.

if object intersects two corners of the tile
  if crossing points are at the tile's diagonal
    remove both horizontal and vertical
  else if crossing points are at adjacent corners of the tile
    if the corners are on both the north side or both on the south side
      remove vertical and tildeHorizontal
    else
      remove horizontal and tildeHorizontal
else if object traverses through opposite tile edges
  if the object traverses east and west sides
    remove vertical
  else
    remove horizontal
else if object traverses adjacent tile edges
  use the location where the object crosses the tile boundary to determine which directions to remove. If the long side is on the vertical edge, then remove horizontal, vertical, and tildeHorizontal. If the long side is on the horizontal edge, then remove horizontal, vertical, and tildeVertical. In the case where the lengths are the same, no directions are removed.
end if Pseudo Code 1

Blocking Directions Based on an Object

Figure 10:
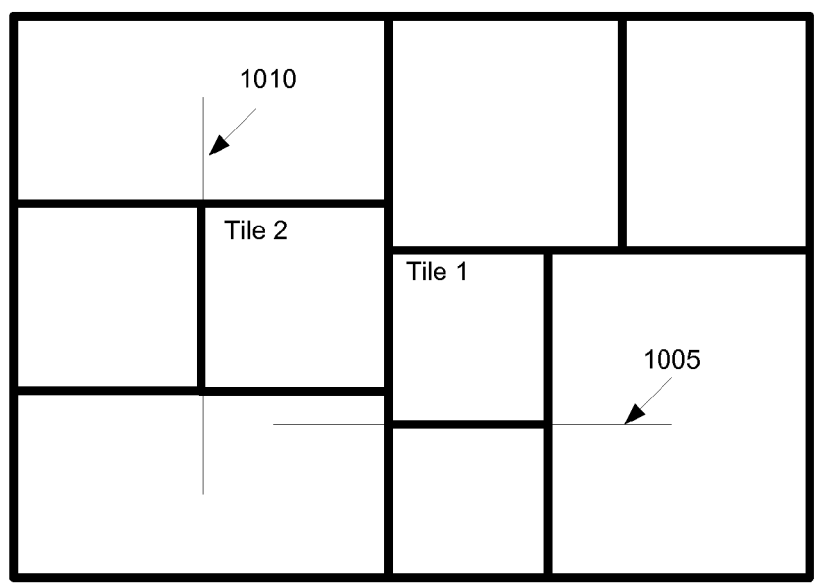
FIG. 10 illustrates several user defined objects passing through adjacent corners of some tiles.

As shown in the pseudo code above, if an object (such as the locked etch 605 shown in FIG. 6) crosses two diagonal corners of a tile, both horizontal and vertical directions are removed from the list of "available" preferred routing directions of the tile. Otherwise, if the object passes through two adjacent corners that are either both on the north side or both on the south side of the tile, the vertical and tildeVertical directions are removed from the available list. On the other hand, if the object passes through two adjacent corners that are both on the east side or both on the west side of the tile, the horizontal and tildeHorizontal directions are removed. Specifically, FIG. 10 illustrates two flows 1005 and 1010. Flow 1005 passes through the two south corners of Tile 1. Based on this flow, the vertical and tildeVertical directions are removed for Tile 1. On the other hand, flow 1010 passes through the two west corners of Tile 2. Based on this flow, the horizontal and tildeHorizontal directions are removed for Tile 2.

Figure 11:
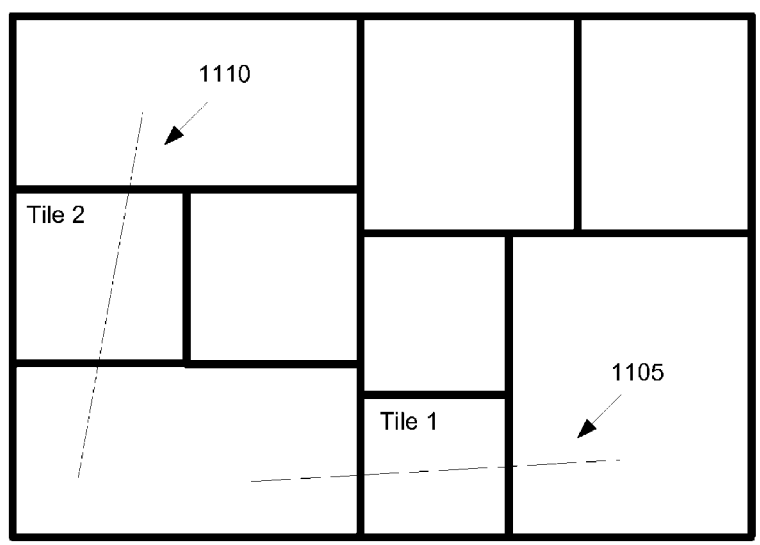
FIG. 11 illustrates several user defined objects traversing the opposite edges of some tiles.

Also, as shown in the pseudo code above, if the object traverses through the opposite tile edges, either horizontal or vertical direction is removed based on which edges the object traverse. Specifically, FIG. 11 illustrates two objects 1105 and 1110. These objects can be any user specified constraint such as flows or locked etches. Object 1105 traverses the east and west edges of Tile 1. Based on this object, the vertical direction is removed from the list of available directions of Tile 1. Object 1110, on the other hand, traverses the north and south edges of Tile 1. Based on this object, the horizontal direction is removed from the list of available directions of Tile 2.

Figure 12:
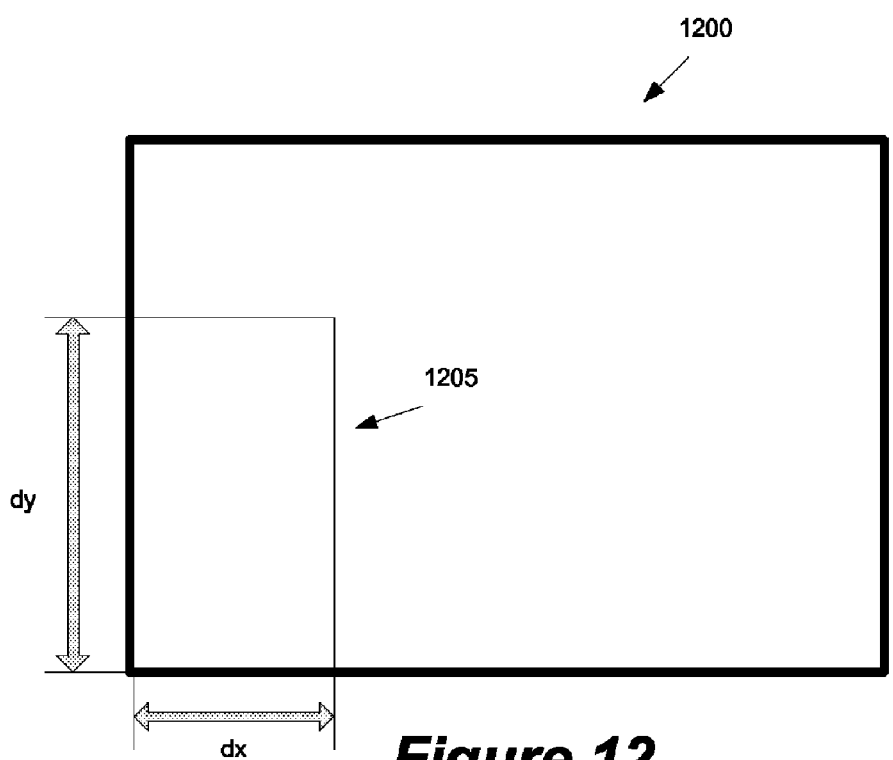
FIG. 12 illustrates a user defined object traversing the adjacent edges of a tile.

Also, if the object traverses through adjacent tile edges, the blocked directions are determined based on where the object intersects the edges. FIG. 12 illustrates an object 1205 (such as a flow or a locked etch) that passes through a tile 1200. As shown, if dx>dy, horizontal, vertical, and tildeVertical directions are removed from the list of available directions of the tile. Alternatively, some embodiments only remove horizontal and vertical directions. If dy>dx, horizontal, vertical, and tildeHorizontal directions are removed from the list of available directions of the tile. Alternatively, some embodiments only remove horizontal and vertical directions. Otherwise, if dx=dy, the interim preferred no directions are removed. Alternatively, if dx=dy, some embodiments remove horizontal and vertical directions.

Next, the process determines (at 925) whether all tiles that are affected by the selected object are examined. If not, the process selects (at 930) the next tile affected by the currently selected object and proceeds to 920 that was described above. Otherwise, the process determines (at 940) whether all objects are examined. If not, the process selects (at 945) the next object to examine and proceeds to 915 that was described above.

Otherwise, the process examines (at 950-990) all tiles to determine their final preferred routing direction. Specifically, the process selects (at 950) the first tile to examine. Next, the process determines (at 960) whether any preferred routing directions remain available for the tile. If not, the process sets (at 965) the preferred routing direction of the tile to the default preferred routing direction of the current layer of the design layout (i.e., the layer that the current tile is located at). The process then proceeds to 985 which is described below.

If on the other hand, there are still some preferred routing directions available for the tile, the process determines (at 970) whether only one preferred direction is still available for the tile. If yes, the process sets (at 975) the preferred routing direction of the tile to the only remaining available preferred routing direction of the tile. The process then proceeds to 985 which is described below. If, on the other hand, more than one preferred routing direction remains available for the tile, the process uses (at 980) a predetermined set of rules to select a final preferred routing direction for the tile. The following pseudo code shows an algorithm that some embodiments use to set the final preferred routing direction of a tile when several preferred routing directions are still available for the tile.

```
if the available preferred direction set includes both vertical and horizontal
    set the final preferred routing direction of the tile to Any-
        Direction
else if the available preferred direction is vertical
    set the final preferred routing direction of the tile to vertical
else if the available preferred direction is horizontal
    set the final preferred routing direction of the tile to hori-
        zontal
else if the available preferred direction set includes both
tildeVertical and tildeHorizontal
    set the final preferred routing direction of the tile to Any-
        Direction
else if the available preferred direction is tildeVertical
    set the final preferred routing direction of the tile to tilde-
        Vertical
else if the available preferred direction is tildeHorizontal
    set the final preferred routing direction of the tile to tilde-
        Horizontal
else
    do nothing
end if
```

Pseudo Code 2

Setting the Final Preferred Routing Direction of a Tile when Several Preferred Routing Directions are Still Available for the Tile As shown in the above pseudo code, each different combination of available preferred routing directions result in a specific final preferred routing direction for each tile. For instance, if the available preferred direction set includes both vertical and horizontal directions, the final preferred routing direction of the tile is set to AnyDirection. Otherwise, if the available preferred direction is vertical, the final preferred routing direction of the tile to vertical. Otherwise, if the available preferred direction is horizontal, set the final preferred routing direction of the tile to horizontal, and so on.

Next, the process determines (at 985) whether all tiles are examined. If not, the process selects (at 990) the next tile to examine and proceeds to 960 which was described above. Otherwise, the process exits.

Some embodiments implement a variation of process 900 which starts with an empty list of blocked preferred routing directions for each tile. As more objects are examined, these embodiments add more blocked directions to each list, rather than removing available directions.

III. Determining Preferred Routing Directions on Regions

Some embodiments use a predetermined set of preferred local routing directions. These embodiments initialize the preferred local routing direction of each tile to a predetermined interim direction. Each tile is then individually examined to compute new directions based on each user specified constraint that affects the selected tile. These newly computed directions are merged (or blended) with the current interim preferred direction of the tile. The final preferred local routing direction of a tile is, therefore, determined based on which interim directions, if any, are merged with the initial interim preferred direction.

Different embodiments use different values for the above mentioned initial predetermined interim direction. Some embodiments initialize all tiles directions to the interim preferred direction of "UnknownDirection". Some embodiments first perform process 900 to determine a preferred routing direction of each tile using the "blocking" method described in Section II above. This direction is then used to initialize the interim preferred routing direction of each tile for the "merging" approach described in this section.

Figure 13:
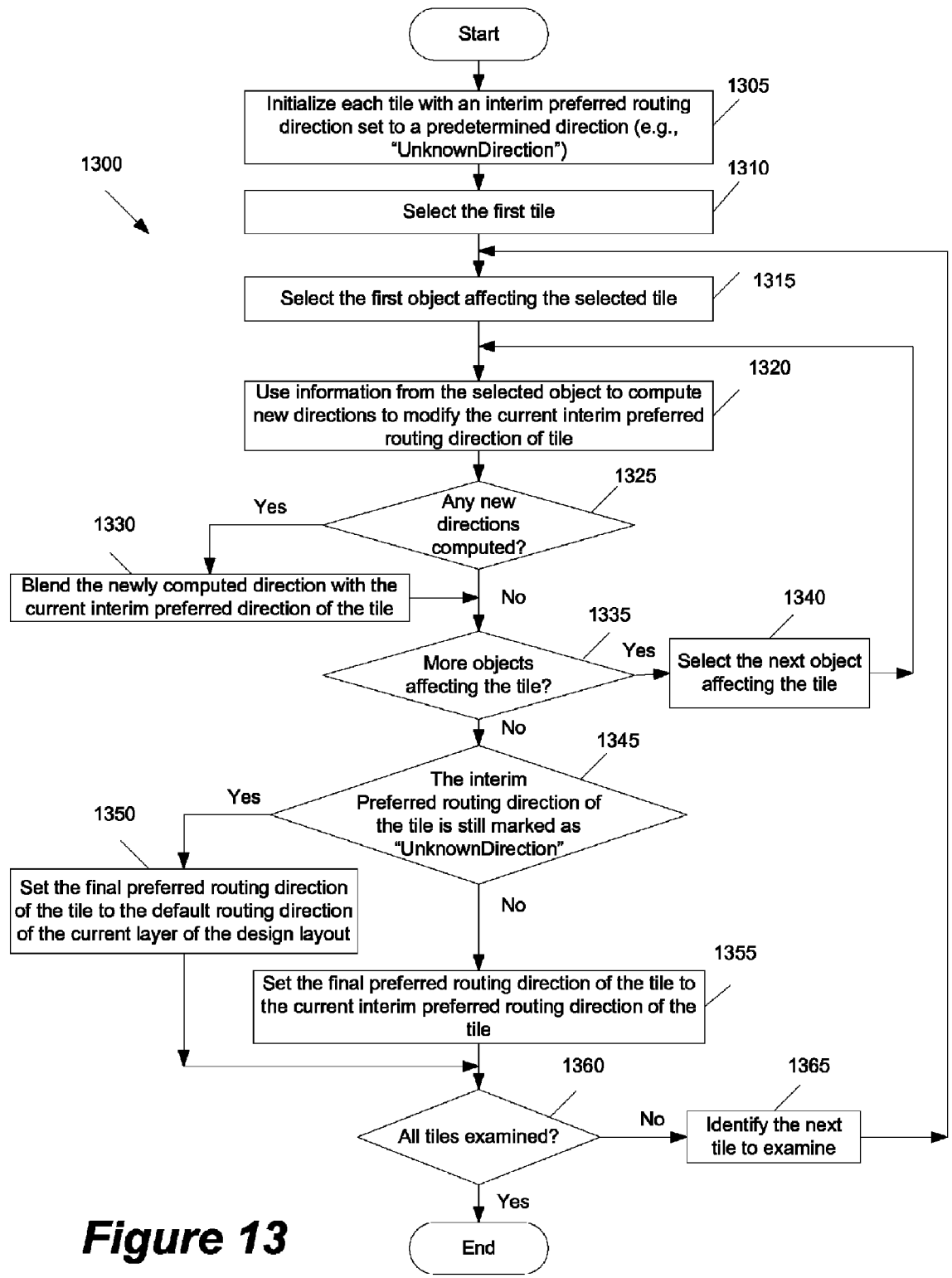
FIG. 13 conceptually illustrates an alternative process for determining preferred local routing directions in some embodiments.

FIG. 13 conceptually illustrates a process 1300 that uses the above mentioned "merging" approach to determine preferred routing directions on regions of a circuit design layout such as an IC, a PCB, or an IC package. Each layer of the circuit design layout has a default (or general) preferred routing direction. For instance, the top layer in some embodiments may have a horizontal default preferred routing direction, while the bottom layer may have a vertical default preferred routing direction. In the following discussions, the words etch and route are used interchangeably as the invention applies to all above mentioned design layouts.

For simplicity, the steps of defining the user specified constraints (which were described in 405-420 above) and tessellation (which was described in 425 above) are not shown in FIG. 13. As shown in FIG. 13, the process initializes (at 1305) each tile with an interim preferred local routing direction set to a predetermined direction. Some embodiments mark the interim preferred direction of all tiles to "UnknownDirection". Some embodiments perform the "blocking" process 900 described in Section II above, to find a set of preferred directions for each tile. This set is then used by process 1300 to set the initial direction of the interim preferred direction of each tile. As described below, this interim preferred routing direction is then updated through the rest of the process to reach to a final preferred routing direction for each tile. There are many possible preferred routing directions for a tile. Some embodiments use the set of possible preferred routing directions described in Section II above.

Next process 1300 selects (at 1310) the first tile to examine. The process then selects (at 1315) the first object that affects the selected tile. The process uses (at 1320) information from the selected object to compute new direction (or directions) to merge with the current interim preferred routing direction of the tile. Some embodiments do not consider the effect (if any) of a flow that does not completely pass through a tile. For instance, flow 515, shown in FIG. 5, is an example of a flow that does not completely pass through a tile. Specifically, flow 515 enters Tile 1 but ends in the flow via 520. Flow 515, therefore, has no effect on the preferred routing direction of Tile 1. However, if a flow completely passes through a tile (such as flow 510 that completely passes through Tile 1), the direction of the flow is considered to determine the preferred direction of the tile. Similarly, a locked etch that does not completely pass through a tile (such as locked etch 610 in FIG. 6 that does not completely pass through Tile 4) has no effect on the preferred routing direction of that tile.

The pseudo code below illustrates how some embodiments determine an interim preferred direction based on an object that goes through a tile.

```
if object intersects two corners of the tile
   if crossing points are at the tile's diagonal
      set the interim preferred direction to both tildeVertical
         and tildeHorizontal
   else if crossing points are at adjacent corners of the tile
      if the corners are on both the north side or both on the
         south side
         the interim direction is horizontal
      else
         the interim direction vertical
else if object traverses through opposite tile edges
   if the object traverses east and west sides
      the interim direction is horizontal
   else
      the interim direction is vertical
else if object traverses adjacent tile edges or one corner and
one edge
   use the location where the object crosses the tile boundary
      to determine if the interim direction is tildeVertical or
      tildeHorizontal. If the long side is on the vertical edge
      the interim direction is a tildeVertical. If the long side is
      on the horizontal edge the interim direction is tildeHo-
      rizontal. In the case where the lengths are the same, set
      both tildeVertical and tildeHorizontal
end if
```

Pseudo Code 3

Determining Direction Based on an Object

As shown in the pseudo code above, if an object (such as the locked etch 605 shown in FIG. 6) crosses two diagonal corners of a tile, the interim preferred direction is set to tildeVertical and tildeHorizontal. Otherwise, if the object passes through two adjacent corners, the direction is either vertical or horizontal based on which corners the object intersects. For instance, flow 1005 (shown in FIG. 10) passes through the two south corners of Tile 1. The interim preferred direction for Tile 1 is set to Horizontal. Flow 1010 passes through the two west corners of Tile 2. The interim preferred direction for Tile 2 is set to Vertical.

Similarly, if the object traverses through the opposite tile edges, the interim direction is horizontal or vertical based on which edges the object traverse. For instance, object 1105 (shown in FIG. 11) traverses the east and west edges of Tile 1. The interim preferred direction for Tile 1 is set to Horizontal. Object 1110, on the other hand, traverses the north and south edges of Tile 1. The interim preferred direction for Tile 2 is set to Vertical.

Also, if the object traverses through adjacent tile edges, the interim direction is determined based on where the object intersects the edges. Object 1205 shown in FIG. 12 is an object (such as a flow or a locked etch) that passes through the tile 1200. As shown, if dx>dy, the interim preferred direction for the tile is set to tildeHorizontal. If dy>dx, the interim preferred direction for the tile is set to tildeVertical. Otherwise, if dx=dy, the interim preferred direction is set to AnyDirection.

After 1320, process 1300 determines (at 1325) whether one or more new preferred directions are computed for the tile. If not, the process proceeds to 1335 which is described below. Otherwise, the process blends (at 1330) the newly computed preferred routing directions with the current interim preferred routing direction of the tile. The process then proceeds to 1335 which is described below. The following pseudo code shows an algorithm that some embodiments use to blend a newly computed direction with the current interim preferred direction of a tile.

```
if the newly computed direction is horizontal or vertical
   set the tile interim preferred direction to the newly com-
      puted direction
   if the current interim preferred direction is horizontal or
      vertical
      do nothing
else if the newly computed directions are tildeVertical and
      tildeHorizontal
   set the interim preferred tile direction to AnyDirection
else if the current interim preferred direction is tildeVerti-
      cal and the newly computed direction is tildeHorizontal
   set the tile to AnyDirection
else if the current interim preferred direction is Unknown-
      Direction and the newly computed direction is tildeHo-
      rizontal
   set the interim preferred direction to tildeHorizontal
else if the current interim preferred direction is tildeHori-
      zontal and the newly computed direction is tildeVertical
   set the interim preferred direction to AnyDirection
else if the current interim preferred direction is Unknown-
      Direction and the newly computed direction is tildeVer-
      tical
   set the interim preferred direction to tildeVertical
else
   do nothing
endif
```

Pseudo Code 4

Blending a Newly Computed Preferred Direction for a Tile with the Current Interim Preferred Routing Direction of a Tile As shown in the pseudo code above, the newly preferred routing direction is blended with the current interim preferred routing direction to update the interim preferred routing direction. For instance, if the newly computed direction is horizontal or vertical interim preferred direction of the tile is set to the newly computed direction. Otherwise, if the current interim preferred direction is horizontal or vertical, the preferred direction of the tile is not change. Otherwise, if the newly computed directions are tildeVertical and tildeHorizontal, the interim preferred direction of the tile is set to AnyDirection, and so on. A person of ordinary skill in the art would realize that similar rules can be defined if other preferred routing directions are defined.

Next, the process determines (at 1335) whether more objects affect the currently selected tile. If yes, the process selects (at 1340) the next object that affects the tile and proceeds to 1320 which was described above. If the process determines (at 1335) that no more objects affect the current tile, the process determines (at 1345) whether the interim preferred routing direction of the tile is still marked as "UnknownDirection". This is the case, for instance, when the interim preferred routing direction was initialized to "UnknownDirection" and no user specified constraints go through the tile. If the interim preferred direction is still "UnknownDirection", the process sets (at 1350) the final preferred routing direction of the tile to the default routing direction of the current layer of the design layout (i.e., the layer that the current tile is located in it). The process then proceeds to 1360 which is described below. In embodiments that initialize the interim preferred routing directions of the tile to the direction that is determined by the "blocking" method of process 900, operations 1345 and 1350 are not performed.

If (after 1345), the process determines that the interim preferred direction is not marked as "UnknownDirection", the process sets (at 1355) the final preferred routing direction of the tile to the current interim preferred routing direction of the tile. Next, the process determines (at 1360) whether all tiles in the design layout are examined. If not, the process identifies (at 1365) the next tile to examine and proceeds to 1315 (which was described above) to process the next tile. Otherwise, the process exits.

Once the preferred local routing direction has been assigned for all tiles, standard costing rules are used to establish what is considered "wrong-way" routing and what cost, if any, should be assigned to that wrong-way routing. The routing processes 900 and 1300, therefore, automatically define the preferred direction of each tile by taking into account the available information (locked etch, flows, etch keep-out, planned data, etc.) about the tile. As described for the embodiments above, the preferred routing directions for all areas of the design are no longer dictated by the preferred routing direction for the entire layer. The routing process also takes into account any of the existing geometries on the design and is not restricted to choose paths early on that would not be allowed later. This allows the router to generate fewer expansion probes to find solutions. Fewer expansion probes improve the speed of the routing engine (SCR).

By incorporating knowledge of the local routing conditions, the path selection algorithms can select the best paths. This results in efficient use of the available routing real estate. Use of this invention allows the routing engine (SCR) to run faster, pushing and popping fewer probes during expansion for designs with flows and/or locked etch. By adapting the wrong-way costs to the local routing conditions, better path selection is obtained. With better path selection, the entire router is more powerful (gets better completion and works faster).

IV. The Computer System

Figure 14:
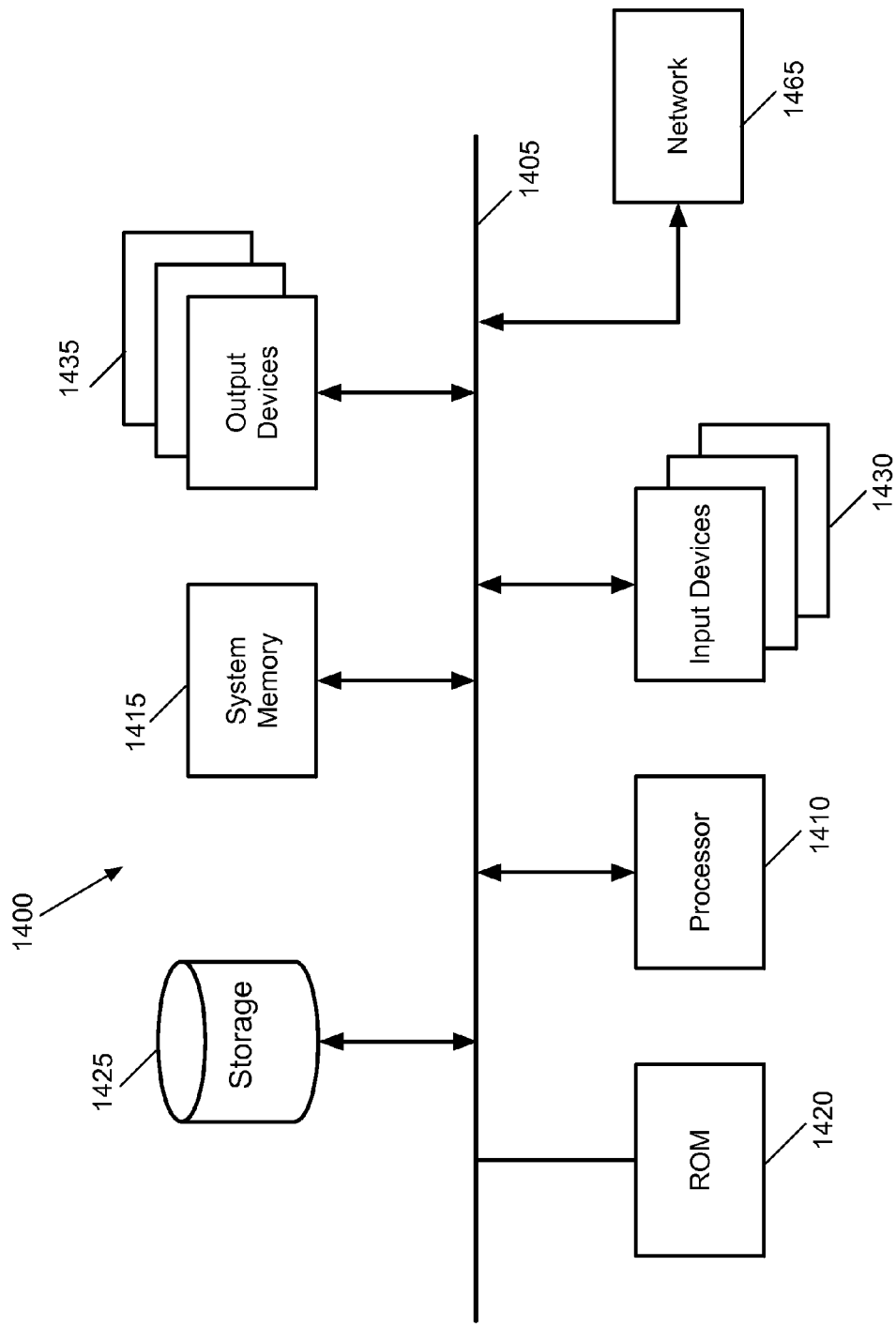
FIG. 14 conceptually illustrates a computer system with which one embodiment of the invention is implemented.

FIG. 14 conceptually illustrates a computer system with which one embodiment of the invention is implemented. Computer system 1400 includes a bus 1405, a processor 1410, a system memory 1415, a read-only memory 1420, a permanent storage device 1425, input devices 1430, and output devices 1435.

The bus 1405 collectively represents all system, peripheral, and chipset buses that support communication among internal devices of the computer system 1400. For instance, the bus 1405 communicatively connects the processor 1410 with the read-only memory 1420, the system memory 1415, and the permanent storage device 1425.

From these various memory units, the processor 1410 retrieves instructions to execute and data to process in order to execute the processes of the invention. The read-only memory (ROM) 1420 stores static data and instructions that are needed by the processor 1410 and other modules of the computer system. The permanent storage device 1425, on the other hand, is a read-and-write memory device. This device is a non-volatile memory unit that stores instruction and data even when the computer system 1400 is off. Some embodiments of the invention use a mass-storage device (such as a magnetic or optical disk and its corresponding disk drive) as the permanent storage device 1425. Other embodiments use a removable storage device (such as a floppy disk or Zip® disk, and its corresponding disk drive) as the permanent storage device.

Like the permanent storage device 1425, the system memory 1415 is a read-and-write memory device. However, unlike storage device 1425, the system memory is a volatile read-and-write memory, such as a random access memory. The system memory stores some of the instructions and data that the processor needs at runtime. In some embodiments, the invention's processes are stored in the system memory 1415, the permanent storage device 1425, and/or the read-only memory 1420.

The bus 1405 also connects to the input and output devices 1430 and 1435. The input devices enable the user to communicate information and select commands to the computer system. The input devices 1430 include alphanumeric keyboards and cursor-controllers. The output devices 1435 display images generated by the computer system. For instance, these devices display IC design layouts. The output devices include printers and display devices, such as cathode ray tubes (CRT) or liquid crystal displays (LCD).

Finally, as shown in FIG. 14, bus 1405 also couples computer 1400 to a network 1465 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1400 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. For instance, the user specified constraints shown in 405-420 can be entered in any order and some embodiments may not utilize all these user specified constraints. Also, different preferred local routing directions (including diagonal preferred local routing directions) are defined in some embodiments.

The tiles identified after tessellating can overlap or encompass one or more of the regions for which the user specified constraints are identified. Some tiles can fall within one of those regions. Also, some embodiments determine tiles independently of the user specified constraints. Some embodiments, on the other hand, utilize the user specified constraints (for instance, the vertices of etch keep-out areas) as a criteria for determining tile locations. The available routable space of the circuit design layout can be tessellated into shapes other than rectangular. Also, the invention can be implemented for detailed routers as well as for global routers. Thus, one of ordinary skill in the art would understand that the invention is not to be limited by the foregoing illustrative details, but rather is to be defined by the appended claims.

We claim:

1. A computer-implemented method for routing a multilayer circuit design layout, wherein the multilayer circuit design layout has a set of possible preferred local routing directions, wherein each layer has a default preferred routing direction, the method comprising:

receiving, from a user, a designation of a set of regions on the multilayer circuit design layout not to be used for routing;

for each particular layer of the multilayer circuit design layout, tessellating space of the particular layer of the multilayer circuit design layout that is available for routing, into a plurality of separate tiles; and by a computer, automatically defining a preferred local routing direction for each tile, said direction avoiding routing in said set of regions designated not to be used for routing, wherein the preferred local routing direction for at least one tile on a specific layer is different than the default preferred routing direction for the specific layer.

2. The computer-implemented method of claim 1 further comprising receiving, from the user, a set of user designated flows, wherein said set of user designated flows is a set of polylines that the user has specified as approximate paths for one or more connections to act as a guide for routing, wherein automatically defining the preferred local routing direction further comprises automatically defining the preferred local routing direction based on the set of user designated flows.

3. The computer-implemented method of claim 1 further comprising receiving, from the user, a designation of a set of locked etches, wherein a locked etch is a connection between a source location and a target location of a route that the user has designated not to be modified, wherein automatically defining the preferred local routing direction further comprises automatically defining the preferred local routing direction based on the set of locked etches.

4. The computer-implemented method of claim 1 further comprising receiving, from the user, planned data, wherein said planned data is data specified by the user to define intent or strategy of a user design, wherein automatically defining the preferred local routing direction further comprises automatically defining the preferred local routing direction based on the received planned data.

5. The computer-implemented method of claim 1, wherein the design layout is one of an integrated circuit (IC), a printed circuit board (PCB), and an IC package.

6. The computer-implemented method of claim 1 further comprising:
using said preferred local routing directions to establish a set of wrong-way routing directions for each tile; and
using a set of costing rules to assign costs to wrong-way routing.

7. The computer-implemented method of claim 1, wherein said set of possible preferred local routing directions comprises one of:
a tildehorizontal routing direction having no directional costs for a horizontal route and a relatively small directional cost for a vertical route;
a tildevertical routing direction having no directional costs for a vertical route and a relatively small directional cost for a horizontal route;
a horizontal preferred routing direction having no directional costs for a horizontal route and a relatively high directional cost for a vertical route;
a vertical preferred routing direction having no directional costs for a vertical route and a relatively high directional cost for a horizontal route; and
a routing direction designated as any direction having no directional costs for vertical routing and no directional costs for horizontal routing.

8. The computer-implemented method of claim 1, wherein said automatically defining the preferred local routing direction comprises:
initializing an interim preferred routing direction of each tile to a predetermined direction;
using the set of regions designated not to be used for routing to compute new routing directions for each tile;
using said new routing directions to modify said interim preferred routing direction of each tile; and
using said interim preferred routing direction of each particular tile to define a final preferred routing direction for the particular tile.

9. The computer-implemented method of claim 1, wherein at least two different tiles of the particular layer of the multilayer circuit design layout comprises two different preferred local routing directions.

10. The computer-implemented method of claim 1, wherein a particular region comprises a particular tile.

11. The computer-implemented method of claim 1, wherein a particular tile comprises a particular region.

12. The computer-implemented method of claim 1, wherein a particular tile is the same as a particular region.

13. The computer-implemented method of claim 1, wherein the set of regions not to be used for routing are for blocking a set of local routing directions.

14. The computer-implemented method of claim 1, wherein said set of user-designated regions is received through a graphical user interface ("GUI").

15. A computer-implemented method for routing a multilayer circuit design layout, wherein the multilayer circuit design layout has a set of possible preferred local routing directions, wherein each layer has a default first preferred routing direction, the method comprising:
receiving, from a user, a set of user specified preferred local routing directions for particular regions of the multilayer circuit design layout;
by a computer, generating a routing plan based on the set of user specified preferred local routing directions;
iteratively performing said receiving and said generating until an acceptable routing plan is identified by the user;
for at least one particular layer of the multilayer circuit design layout, tessellating space of the particular layer of the multilayer circuit design layout that is available for routing into a plurality of separate tiles; and
automatically defining a local second preferred routing direction for each tile based on said identified acceptable routing plan, wherein the local second preferred routing direction for a particular tile on a particular layer is different than the default first preferred routing direction of the particular layer.

16. The computer-implemented method of claim 15, wherein said set of user specified preferred local routing directions comprises a set of user designated flows, wherein said set of user designated flows is a set of polylines that the user has specified as approximate paths for one or more connections to act as a guide for routing.

17. The computer-implemented method of claim 15, wherein the design layout is one of an integrated circuit (IC), a printed circuit board (PCB), and an IC package.

18. The computer-implemented method of claim 15 further comprising:
using said local second preferred routing directions to establish a set of wrong-way routing directions for each tile; and
using a set of costing rules to assign costs to wrong-way routing.

19. A computer-implemented method for determining preferred routing directions for a multilayer circuit design layout, wherein the multilayer circuit design layout has a set of possible preferred routing directions, wherein each layer has a default preferred routing direction, the method comprising:
for at least one particular layer of the layers of the multilayer circuit design layout, tessellating space of the particular layer of the multilayer circuit design layout that is available for routing, into a plurality of separate tiles;
initializing each tile with the set of possible preferred routing directions as available;

receiving, from a user, a designation of a set of wiring connections on the multilayer circuit design layout not to be modified;

by a computer, determining which preferred routing directions from the set of possible preferred routing directions are blocked for each tile by the set of wiring connections designated not to be modified; and determining preferred local routing directions for each tile based on preferred directions that are not blocked for each tile, wherein at least two tiles on a same layer have different preferred local routing directions.

20. The computer-implemented method of claim 19, wherein the design layout is one of an integrated circuit (IC), a printed circuit board (PCB), and an IC package.

21. The computer-implemented method of claim 19 further comprising:

receiving, from the user, a set of user designated flows, wherein said set of user designated flows is a set of polylines that the user has specified as approximate paths for one or more connections to act as a guide to a router; and determining which preferred routing directions from the set of possible preferred routing directions are blocked for each tile based on the set of user designated flows.

22. The computer-implemented method of claim 19 further comprising:

receiving, from the user, a designation of a set of etch keep-out areas, wherein an etch keep-out area is a region of the multilayer circuit design layout that the user has indicated not to be used for routing; and determining which preferred routing directions from the set of possible preferred routing directions are blocked for each tile by the set of etch keep-out areas.

23. The computer-implemented method of claim 19 further comprising:

receiving, from the user, planned data, wherein said planned data is data defined by the user to define intent or strategy of a user design; and determining which preferred routing directions from the set of possible preferred routing directions are blocked for each tile based on the received planned data.

24. The computer-implemented method of claim 19 further comprising:

using said preferred local routing directions to establish a set of wrong-way routing directions for each tile; and using a set of costing rules to assign costs to wrong-way routing.

25. The computer-implemented method of claim 19, wherein when all possible preferred local routing directions are blocked for a particular tile on a particular layer of the design layout, the preferred local routing direction of the particular tile is set to the default preferred routing direction of said particular layer.

26. A computer readable medium storing a computer program that when executed by a processor routes a multilayer circuit design layout, wherein the multilayer circuit design layout has a set of possible preferred local routing directions, wherein each layer has a default preferred routing direction, the computer program comprising sets of instructions for:

receiving, from a user, a designation of a set of regions on the multilayer circuit design layout not to be used for routing;

tessellating, for each particular layer of the multilayer circuit design layout, space of the particular layer of the multilayer circuit design layout that is available for routing, into a plurality of separate tiles; and automatically defining a preferred local routing direction for each tile, said direction avoiding routing in said set of regions designated not to be used for routing, wherein the preferred local routing direction for at least one tile on a specific layer is different than the default preferred routing direction for the specific layer.

27. The computer readable medium of claim 26, wherein said computer program further comprises a set of instructions for receiving, from the user, a set of user designated flows, wherein said set of user designated flows is a set of polylines that the user has specified as approximate paths for one or more connections to act as a guide for routing, wherein the set of instructions for automatically defining the preferred local routing direction further comprises a set of instructions for automatically defining the preferred local routing direction for each tile based on the set of user designated flows.

28. The computer readable medium of claim 26, wherein said computer program further comprises a set of instructions for receiving, from the user, a designation of a set of locked etches, wherein a locked etch is a connection between a source location and a target location of a route that the user has designated not to be modified, wherein the set of instructions for automatically defining the preferred local routing direction further comprises a set of instructions for automatically defining the preferred local routing direction for each tile based on the set of locked etches.

29. The computer readable medium of claim 26, wherein the set of regions are for blocking a set of local routing directions.

30. The computer readable medium of claim 26, wherein the design layout is one of an integrated circuit (IC), a printed circuit board (PCB), and an IC package.

31. A system comprising:

at least one processor for executing sets of instructions; and a memory for storing a computer program for determining preferred routing directions for a multilayer circuit design layout, wherein the multilayer circuit design layout has a set of possible preferred routing directions, wherein each layer has a default preferred routing direction, the computer program comprising sets of instructions for:

tessellating, for at least one particular layer of the layers of the multilayer circuit design layout, space of the particular layer of the multilayer circuit design layout that is available for routing, into a plurality of separate tiles;

initializing each tile with the set of possible preferred routing directions as available;

receiving, from a user, a designation of a set of wiring connections on the multilayer circuit design layout not to be modified;

determining which preferred routing directions from the set of possible preferred routing directions are blocked for each tile by the set of wiring connections designated not to be modified; and determining preferred local routing directions for each tile based on preferred directions that are not blocked for each tile, wherein at least two tiles on a same layer have different preferred local routing directions.

32. The system of claim 31, wherein the design layout is one of an integrated circuit (IC), a printed circuit board (PCB), and an IC package.

33. The system of claim 31, wherein said computer program further comprises sets of instructions for:

receiving, from the user, a set of user designated flows, wherein said set of user designated flows is a set of polylines that the user has specified as approximate paths for one or more connections to act as a guide to a router; and determining which preferred routing directions from the set of possible preferred routing directions are blocked for each tile by the user designated flows.

34. The system of claim 31, wherein said computer program further comprises sets of instructions for:

receiving, from the user, a designation of a set of etch keep-out areas, wherein an etch keep-out area is a region of the multilayer circuit design layout that the user has indicated cannot be used for any etch; and determining which preferred routing directions from the set of possible preferred routing directions are blocked for each tile by the set of etch keep-out areas.

35. The system of claim 31, wherein said computer program further comprises sets of instructions for:

receiving, from the user, planned data, wherein said planned data is data defined by the user to define intent or strategy of a user design; and determining which preferred routing directions from the set of possible preferred routing directions are blocked for each tile based on the received planned data.

36. The system of claim 31, said computer program further comprising sets of instructions for:

using said preferred local routing directions to establish a set of wrong-way routing directions for each tile; and using a set of costing rules to assign costs to wrong-way routing.

37. The system of claim 31, said computer program further comprising a set of instructions for setting the preferred local routing direction of a particular tile to the default preferred routing direction of a particular layer when all possible preferred local routing directions are blocked for the particular tile on the particular layer of the design layout.

* * * * *